(12) United States Patent
Ye et al.

(10) Patent No.: US 12,285,735 B2
(45) Date of Patent: Apr. 29, 2025

(54) PREPARATION METHOD AND USE METHOD OF MATERIAL FOR DEEP PURIFICATION OF HF ELECTRONIC GAS

(71) Applicant: Zhejiang Britech Co., Ltd., Zhejiang (CN)

(72) Inventors: Xiangrong Ye, Quzhou (CN); Liyang Zhou, Quzhou (CN); Gang Chen, Quzhou (CN); Huilong He, Quzhou (CN); Xueliang Zhang, Quzhou (CN); Jun Li, Quzhou (CN); Jingsen Zhou, Quzhou (CN); Yunfeng Zhang, Quzhou (CN)

(73) Assignee: ZHEJIANG BRITECH CO., LTD., Zhejiang (CN)

( * ) Notice: Subject to any disclaimer, the term of this patent is extended or adjusted under 35 U.S.C. 154(b) by 350 days.

(21) Appl. No.: 17/641,019

(22) PCT Filed: Apr. 14, 2021

(86) PCT No.: PCT/CN2021/087162
§ 371 (c)(1),
(2) Date: Jul. 27, 2022

(87) PCT Pub. No.: WO2021/208949
PCT Pub. Date: Oct. 21, 2021

(65) Prior Publication Data
US 2022/0355267 A1 Nov. 10, 2022

(30) Foreign Application Priority Data

Apr. 15, 2020 (CN) .......................... 202010296836.6

(51) Int. Cl.
| | | |
|---|---|---|
| *B01D 53/02* | (2006.01) | |
| *B01D 53/04* | (2006.01) | |
| *B01D 53/26* | (2006.01) | |
| *B01J 20/02* | (2006.01) | |
| *B01J 20/04* | (2006.01) | |
| *B01J 20/20* | (2006.01) | |
| *B01J 20/30* | (2006.01) | |
| *C01B 7/19* | (2006.01) | |
| *C09K 13/08* | (2006.01) | |

(52) U.S. Cl.
CPC .......... *B01J 20/20* (2013.01); *B01D 53/0415* (2013.01); *B01D 53/261* (2013.01); *B01J 20/0237* (2013.01); *B01J 20/027* (2013.01); *B01J 20/046* (2013.01); *B01J 20/3071* (2013.01); *B01J 20/3078* (2013.01); *B01J 20/3085* (2013.01); *C01B 7/197* (2013.01); *C09K 13/08* (2013.01); *B01D 2253/102* (2013.01); *B01D 2253/112* (2013.01); *B01D 2253/25* (2013.01); *B01D 2256/26* (2013.01); *B01D 2257/80* (2013.01)

(58) Field of Classification Search
CPC ........ B01D 2253/102; B01D 2253/112; B01D 2253/25; B01D 2256/26; B01D 2257/80; B01D 53/0415; B01D 53/261; B01J 20/0237; B01J 20/027; B01J 20/046; B01J 20/20; B01J 20/3071; B01J 20/3078; B01J 20/3085; C01B 7/191; C01B 7/197; C09K 13/08; Y02C 20/30
See application file for complete search history.

(56) References Cited

U.S. PATENT DOCUMENTS

2009/0249953 A1* 10/2009 Millward ............... B01D 53/04
96/108

FOREIGN PATENT DOCUMENTS

CN 110038509 A * 7/2019

OTHER PUBLICATIONS

Translation of CN-110038509-A, Chen (Year: 2019).*

\* cited by examiner

*Primary Examiner* — Christopher P Jones
(74) *Attorney, Agent, or Firm* — Kirk A. Wilson; Joseph T. Guy; Patent Filing Specialist Inc.

(57) ABSTRACT

Provided is a preparation method and use method of a material for deep purification of HF electronic gas. A metal fluoride-loaded activated carbon material $AC/MFx \cdot nH_2O$ is prepared, and a mixed gas flow of carbonyl fluoride and high-purity nitrogen is used to deeply dehydrate the material to obtain the material for deep purification of HF electronic gas AC/MFx. This kind of material has fluoride that can form crystal water to form hydrated metal fluoride, and has strong water absorption properties. Moreover, the anhydrous fluoride and activated carbon do not have to face the problem of being corroded by HF, and the collapse of framework structure and the secondary pollution to HF from reaction products would not be caused. The material has the advantages of high purity and extremely low moisture content when being used for efficiently removing moisture in HF.

4 Claims, 1 Drawing Sheet

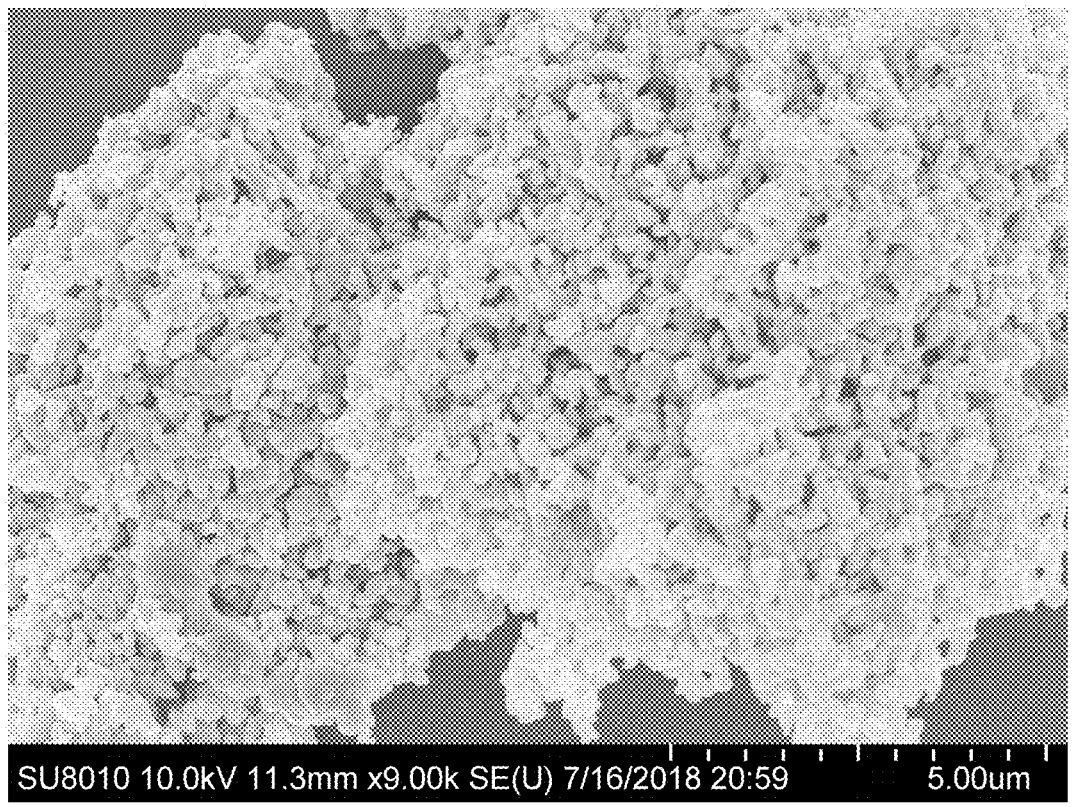

PREPARATION METHOD AND USE METHOD OF MATERIAL FOR DEEP PURIFICATION OF HF ELECTRONIC GAS

CROSS REFERENCE TO RELATED APPLICATION

This patent application claims the benefit and priority of Chinese Patent Application No. 202010296836.6 filed on Apr. 15, 2020, entitled "Preparation method and use method of material for deep purification of HF electronic gas", the disclosure of which is incorporated by reference herein in its entirety as part of the present application.

TECHNICAL FIELD

The present disclosure relates to the technical field of purification of high-purity gases, and in particular to a preparation method and use method of a material for deep purification of HF electronic gas.

BACKGROUND ART

HF electronic gas is an important gas for etching and cleaning in the micro-nano electronic process, and its moisture, metal and non-metal impurities should be strictly controlled.

Chinese patent CN201811207404.2 relates to a using method of a process equipment for preparing electronic-grade hydrogen fluoride, wherein the trivalent arsenic impurities in hydrogen fluoride are oxidized by fluorine gas to generate high-boiling residues of $HAsF_6$ and $MAsF_6$. By means of the volatility difference between the high-boiling residues ($HAsF_6$ and $MAsF_6$) and HF and other components, the pure electronic-grade hydrogen fluoride is separated from the multi-component mixture by multiple equilibrium processes. In a rectification process of the method, reflux liquid and rising gas are used to form a gas-liquid countercurrent contact in a distillation tower. The volatile components are separated from the top of the tower, and the non-volatile components remain at the bottom of the tower. The main component of the generated tail gas is HF steam, as well as the volatile components of $SiF_4$, $PF_3$, $POF_3$, $AsF_5$, $SF_6$, $PF_5$, etc., and the tail gas may be washed with pure water and condensed to prepare industrial-grade hydrofluoric acid.

Chinese patent CN201721280068.5 discloses an equipment for hydrogen fluoride purification, including a reactor, a first distiller, a mixer and a second distiller. The reactor includes a reactor body, the volume of the reactor body is less than 10 L, the upper part of the reactor body is equipped with a stirrer and the side is equipped with a heater, and a stirring shaft of stirrer extends into the reactor body. A crude hydrogen fluoride filling pipe, a silver difluoride liquid filling pipe and a sodium fluoride filling pipe enter the reactor body through the upper end thereof, respectively. The silver difluoride liquid filling pipe is provided with a flow pump and a first electronic valve in sequence. The sodium fluoride filling pipe is connected to a metering bin located outside the reactor body, and the crude hydrogen fluoride filling pipe is provided with a second electronic valve. The mixer is provided with a partition, and a flow hole is arranged at a lower part of the partition. The mixer is provided with a solution of hydrogen fluoride and water, and at the surfaces of the mixer corresponding to both sides of the partition are provided a first inlet and a second inlet, respectively. The first distiller is connected to a discharge port at the lower end of the reactor body through a first delivery pump, and the upper end of the first distiller is connected to the first inlet of the mixer. The lower end of the second distiller is connected to the second inlet of the mixer. The utility model realizes industrial purification of crude hydrogen fluoride, and has high purification efficiency.

Moisture is one of the most critical impurities in HF electronic gas, which triggers strong reactivity and corrosivity of HF, resulting in more impurities such as metal ions as secondary pollution to the HF electronic gas, so that the purity and consistency of the HF electronic gas are deteriorated, and the performance and yield of semiconductor devices are degraded. Advanced micro/nano electronic processes require a strict control of the moisture content in HF electronic gas to less than 1 ppmv. The above disclosures and existing patents generally use adsorbents and rectification process to remove water. However, due to the strong reactivity and corrosivity of water-containing HF, oxide adsorbents such as activated alumina, silica and silicon aluminum oxide molecular sieves all react with HF, and thus cannot be used to efficiently remove water from HF. The carbon-based materials such as activated carbon have limited adsorption efficiency and adsorption capacity for moisture in HF. Moreover, HF is strongly hydrophilic and can form strong hydrogen bonding with water. Therefore, it is difficult for a conventional rectification process to effectively remove moisture in HF to the level of ppb.

SUMMARY

In order to solve the above problems, the present disclosure provides a preparation method and use method of a material for deep purification of HF electronic gas.

A preparation method and use method of a material for deep purification of HF electronic gas, wherein the method for preparing the material comprises:

In parts by mass, dissolving 15.2-45.4 parts of acetate in 2000-4000 parts of pure water, and stirring for 10-30 min; after dissolving uniformly, adding 126.4-186.5 parts of disodium ethylenediaminetetraacetate, and stirring for 10-20 min to form a mixed solution; then adding 7.2-7.8 parts of ammonium fluoride and stirring; after mixing evenly, adding ammonia dropwise to adjust the pH value to 9-11; then adding 130-170 parts of mesoporous activated carbon (AC) and 0.1-0.5 parts of sodium tetrafluoroborate as an inducer, and stirring at 40-60° C. for 20-50 min; subsequently, transferring a resulting mixture to a hydrothermal reactor, and subjecting to a crystallization reaction at 140-180° C. for 80-120 min; thereafter, cooling slowly to room temperature, filtering to obtain a material, repeating washing with absolute ethanol for 3-5 times, then drying a resulting material in an oven at 120-160° C. for 10-18 h to obtain a metal fluoride-loaded activated carbon material $AC/MFx \cdot nH_2O$; and subjecting the metal fluoride-loaded activated carbon material to a deep dehydration to obtain a material AC/MFx for deep purification of HF electronic gas.

In some embodiments, the hydrothermal reactor is a hydrothermal stainless steel reactor lined with PTFE.

In some embodiments, the acetate is alkali metal acetate, alkaline earth metal acetate, rare earth metal acetate or transition metal acetate.

In some embodiments, the deep dehydration comprises: placing the metal fluoride-loaded activated carbon material $AC/MFx \cdot nH_2O$ in a mixed gas flow of carbonyl fluoride and high-purity nitrogen for 20-60 min, a volume ratio of carbonyl fluoride to high-purity nitrogen in the mixed gas flow is 0.1-0.5:1, and a gas flow rate of the mixed gas flow is 0.5-5 L/min per kilogram of the material.

In some embodiments, the mesoporous activated carbon is a mesoporous activated carbon with a high mesoporosity, and prepared as follows:

In parts by mass, adding 7-34 parts of ammonium dihydrogen phosphate, 16-44 parts of dodecylurea, 1-8 parts of urea and 0.05-0.3 parts of 1-butyl-3-methylimidazolium molybdotungstophosphate into 1000-3000 parts of water and stirring; after mixing evenly, soaking 100-200 parts of a cleaned wood dust in a resulting mixed solution at room temperature for 5-10 h, and then heating to 40-80° C. and treating for 30-40 min; then taking out the wood dust, drying and then drying in an oven at 200-280° C. for 30-60 min by blowing air; subsequently, pulverizing and sintering the pulverized material in a high-temperature furnace under an inert atmosphere at a temperature of 400-800° C. for 1-6 h; then controlling a temperature at 300-400° C., introducing an activated gas, and treating for 20-40 min; thereafter, purging with dried nitrogen for 5-10 min to obtain the mesoporous activated carbon with a high mesoporosity, wherein the activated gas includes 10%-25% of air, 5%-20% of water vapor and the balance of nitrogen.

In the 1-butyl-3-methylimidazolium molybdotungstophosphate modified mesoporous activated carbon with a high mesoporosity, molybdotungstophosphoric acid has a strong coordination ability with an oxygen-rich structure, which may avoid the problem of easy desorption of the metal fluoride in HF atmosphere after being immobilized, and prolong the service life of the material for deep purification of HF electronic gas.

The present disclosure provides a material for deep purification of HF electronic gas prepared by the preparation method described in above technical solutions, and has a chemical composition of AC/MFx.

The present disclosure also provides use of the material for deep purification of HF electronic gas described in above technical solutions in removing moisture in HF.

In some embodiments, the use method of the material for deep purification of HF electronic gas includes: loading the material for deep purification of HF electronic gas in a pressure-resistant stainless steel container to form an adsorption fixed bed, then passing the HF containing trace amount of water through the fixed bed to absorb the trace amount of water in HF by using the material for deep purification of HF electronic gas AC/MFx to form AC/MFx·nH$_2$O, achieving the purpose of further removing moisture in HF.

The present disclosure provides a method for preparing material for deep purification of HF electronic gas. In the present disclosure, a metal fluoride-loaded activated carbon material AC/MFx·nH$_2$O is prepared, and carbonyl fluoride and high-purity nitrogen mixed gas flow is used to deeply dehydrate the material to obtain the material for deep purification of HF electronic gas AC/MFx. This kind of material has metal fluoride that can absorb moisture to form hydrated metal fluoride, and has strong water absorption properties. Moreover, the anhydrous fluoride and activated carbon do not have to face the problem of being corroded by HF, and the collapse of the framework structure and the secondary pollution to HF from reaction products would not be caused. Therefore, it has the advantages of high purity and extremely low moisture content when being used for efficiently removing moisture in HF.

BRIEF DESCRIPTION OF THE DRAWINGS

FIG. 1 is a SU-8010 scanning electron micrograph of the material for deep purification of HF electronic gas AC/MFx prepared in Example 2.

DETAILED DESCRIPTION OF THE EMBODIMENTS

The present disclosure will be further described below in conjunction with embodiments and drawings.

In the experiment, the GB/T 34091-2017 gas chromatography determination method was used to test the impurity content in the HF electronic gas and the volume fraction of the product produced by different schemes.

Example 1

The preparation method and use method of material for deep purification of HF electronic gas, the method for preparing the material has steps as follows:

15.2 g of acetate was dissolved in 2000 g of pure water and stirred for 10 min. After the solution was evenly dissolved, 126.4 g of disodium ethylenediaminetetraacetate was added thereto, stirred for 10 min to form a mixed solution, then 7.2 g of ammonium fluoride was added, and after the resulting mixture was evenly stirred, ammonia was added dropwise to adjust the pH value to 9; then 130 g of mesoporous activated carbon (AC) and 0.1 g of sodium tetrafluoroborate as inducer were added, then the resulting mixture was transferred to a hydrothermal reactor after stirring at 40° C. for 20 min, and the resulting mixture was subjected to crystallization reaction at 140° C. for 80 min; the material was then slowly cooled to room temperature, filtered out and washed with anhydrous ethanol for 3 times, then the resulting material was dried in an oven at 120° C. for 10 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is lithium acetate.

The deep dehydration comprises: the metal fluoride-loaded activated carbon material AC/MFx·nH$_2$O was placed in a mixed gas flow of carbonyl fluoride and high-purity nitrogen and treated for 20 min. A volume ratio of carbonyl fluoride to high-purity nitrogen in the mixed gas flow was 0.1:1, and a gas flow rate of the mixed gas flow was 0.5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/MFx·nH$_2$O, so as to achieve the purpose of further removing moisture in HF.

The mesoporous activated carbon is mesoporous activated carbon with a high mesoporosity, and prepared as follows:

7 g of ammonium dihydrogen phosphate, 16 g of dodecylurea, 1 g of urea and 0.05 g of 1-butyl-3-methylimidazolium molybdotungstophosphate were added to 1000 g of water, stirred and mixed evenly, then 100 g of clean sawdust was soaked in the mixed solution at room temperature for 5 h, then heated to 40° C. for 30 min, and then the sawdust was taken out, and dried in the oven at 200° C. for 30 min by blowing air; then it was pulverized, the pulverized material was sintered in a high-temperature furnace under inert atmosphere at 400° C. for 1 h, then the temperature was controlled at 300° C., activated gas was introduced and the material was treated for 20 min. The resulting material was purged with dry nitrogen for 5 min to obtain the mesoporous activated carbon with a high mesoporosity; the activated gas includes 10% of air, 5% of water vapor, and the balance of nitrogen.

The water content of the high-purity hydrogen fluoride prepared in this example is 24 ppb, and the total content of gas impurities is 48 ppb.

Example 2

The preparation method and use method of material for deep purification of HF electronic gas, the method for preparing the material has steps as follows:

26.1 g of acetate was dissolved in 3000 g of pure water and stirred for 20 min. After the solution was evenly dissolved, 154.6 g of disodium ethylenediaminetetraacetate was added thereto, stirred for 15 min to form a mixed solution, then 7.4 g of ammonium fluoride was added, and after the resulting mixture was evenly stirred, ammonia was added dropwise to adjust the pH value to 10; then 150 g of mesoporous activated carbon (AC) and 0.3 g of sodium tetrafluoroborate as inducer were added, then the resulting mixture was transferred to a hydrothermal reactor after stirring at 50° C. for 30 min, and the resulting mixture was subjected to crystallization reaction at 160° C. for 100 min; the material was then slowly cooled to room temperature, filtered out and washed with anhydrous ethanol for 4 times, then the resulting material was dried in an oven at 140° C. for 15 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is calcium acetate.

The deep dehydration comprises: the metal fluoride-loaded activated carbon material AC/MFx·nH$_2$O was placed in a mixed gas flow of carbonyl fluoride and high-purity nitrogen and treated for 30 min. A volume ratio of carbonyl fluoride to high-purity nitrogen in the mixed gas flow was 0.3:1, and a gas flow rate of the mixed gas flow was 2.5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/MFx·nH$_2$O, so as to achieve the purpose of further removing moisture in HF.

The mesoporous activated carbon is mesoporous activated carbon with a high mesoporosity, and prepared as follows:

18 g of ammonium dihydrogen phosphate, 22 g of dodecylurea, 5 g of urea and 0.1 g of 1-butyl-3-methylimidazolium molybdotungstophosphate were added to 2000 g of water, stirred and mixed evenly, then 160 g of clean sawdust was soaked in the mixed solution at room temperature for 8 h, then heated to 60° C. and treated for 35 min, and then the sawdust was taken out, and dried in the oven at 240° C. for 40 min by blowing air; then it was pulverized, the pulverized material was sintered in a high-temperature furnace under inert atmosphere at 600° C. for 3 h, then the temperature was controlled at 350° C., activated gas was introduced and the material was treated for 30 min. The resulting material was purged with dry nitrogen for 8 min to obtain the mesoporous activated carbon with a high mesoporosity; the activated gas includes 20% of air, 10% of water vapor, and the balance of nitrogen.

The water content of the high-purity hydrogen fluoride prepared in this example is 14 ppb, and the total content of gas impurities is 41 ppb.

The SU-8100 scanning electron microscope photograph of the material for deep purification of HF electronic gas AC/MFx prepared in this example is shown in FIG. 1. It can be seen from FIG. 1 that the metal fluoride is highly dispersed and loaded on the surface and pores of the activated carbon in the form of nanoparticles.

Example 3

The preparation method and use method of material for deep purification of HF electronic gas, the method for preparing the material has steps as follows:

45.4 g of acetate was dissolved in 4000 g of pure water and stirred for 30 min. After the solution was evenly dissolved, 186.5 g of disodium ethylenediaminetetraacetate was added thereto, stirred for 20 min to form a mixed solution, then 7.8 g of ammonium fluoride was added, and after the resulting mixture was evenly stirred, ammonia was added dropwise to adjust the pH value to 11; then 170 g of mesoporous activated carbon (AC) and 0.5 g of sodium tetrafluoroborate as inducer were added, and the resulting mixture was transferred to the hydrothermal reactor after stirring at 60° C. for 50 min, and the resulting mixture was subjected to crystallization reaction at 180° C. for 120 min; the material was then slowly cooled to room temperature, filtered out and washed with anhydrous ethanol for 5 times, then the resulting material was dried in an oven at 160° C. for 18 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is copper acetate.

The deep dehydration comprises: the metal fluoride-loaded activated carbon material AC/MFx·nH$_2$O was placed in a mixed gas flow of carbonyl fluoride and high-purity nitrogen and treated for 60 min. A volume ratio of carbonyl fluoride to high-purity nitrogen in the mixed gas flow was 0.5:1, and a gas flow rate of the mixed gas flow was 5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/MFx·nH$_2$O, so as to achieve the purpose of further removing moisture in HF.

The mesoporous activated carbon is mesoporous activated carbon with a high mesoporosity, and prepared as follows:

34 g of ammonium dihydrogen phosphate, 44 g of dodecylurea, 8 g of urea and 0.3 g of 1-butyl-3-methylimidazolium molybdotungstophosphate were added to 3000 g of water, stirred and mixed evenly, then 200 g of clean sawdust was soaked in the mixed solution at room temperature for 10 h, then heated to 80° C. and treated for 40 min, and then the sawdust was taken out, and dried in the oven at 280° C. for 60 min by blowing air; then it was pulverized, the pulverized material was sintered in a high-temperature furnace under inert atmosphere at 800° C. for 6 h, then the temperature was controlled at 400° C., activated gas was introduced and the material was treated for 40 min. The resulting material was purged with dry nitrogen for 10 min to obtain the mesoporous activated carbon with a high mesoporous rate; the activated gas includes 25% of air, 20% of water vapor, and the balance of nitrogen.

The water content of the high-purity hydrogen fluoride prepared in this example is 11 ppb, and the total content of gas impurities is 37 ppb.

Comparative Example 1

The preparation method and use method of material for deep purification of HF electronic gas, the method for preparing the material has steps as follows:

15.2 g of acetate was dissolved in 2000 g of pure water and stirred for 10 min. After the solution was evenly dissolved, 126.4 g of disodium ethylenediaminetetraacetate was added thereto, stirred for 10 min to form a mixed solution, then 7.2 g of ammonium fluoride was added, and after the resulting mixture was evenly stirred, ammonia was added dropwise to adjust the pH value to 9; then 130 g of mesoporous activated carbon (AC) was added, and the resulting mixture was transferred to the hydrothermal reactor after stirring at 40° C. for 20 min, and the resulting mixture was subjected to crystallization reaction at 140° C. for 80 min; the material was then slowly cooled to room temperature, filtered out and washed with anhydrous ethanol, repeated washing with anhydrous ethanol for 3 times, then the resulting material was dried in an oven at 120° C. for 10 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is lithium acetate.

The deep dehydration comprises: the metal fluoride-loaded activated carbon material AC/MFx·nH$_2$O was placed in a mixed gas flow of carbonyl fluoride and high-purity nitrogen and treated for 20 min. A volume ratio of carbonyl fluoride to high-purity nitrogen in the mixed gas flow was 0.1:1, and a gas flow rate of the mixed gas flow was 0.5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/MFx·nH$_2$O, so as to achieve the purpose of further removing moisture in HF.

The mesoporous activated carbon is mesoporous activated carbon with a high mesoporosity, and prepared as follows:

7 g of ammonium dihydrogen phosphate, 16 g of dodecylurea and 1 g of urea were added to 1000 g of water, stirred and mixed evenly, then 160 g of clean sawdust was soaked in the mixed solution at room temperature for 5 h, then heated to 40° C. for 30 min, and then the sawdust was taken out, and dried in the oven at 200° C. for 30 min by blowing air; then it was pulverized, the pulverized material was sintered in a high-temperature furnace under inert atmosphere at 400° C. for 1 h, then the temperature was controlled at 300° C., activated gas was introduced and the material was treated for 20 min. The resulting material was purged with dry nitrogen for 5 min to obtain the mesoporous activated carbon with a high mesoporosity; the activated gas includes 10% of air, 5% of water vapor, and the balance of nitrogen.

The water content of the high-purity hydrogen fluoride prepared in this example is 46 ppb, and the total content of gas impurities is 119 ppb.

Comparative Example 2

The preparation method and use method of material for deep purification of HF electronic gas, the method for preparing the material has steps as follows:

15.2 g of acetate was dissolved in 2000 g of pure water and stirred for 10 min. After the solution was evenly dissolved, 126.4 g of disodium ethylenediaminetetraacetate was added thereto, stirred for 10 min to form a mixed solution, then 7.2 g of ammonium fluoride was added, and after the resulting mixture was evenly stirred, ammonia was added dropwise to adjust the pH value to 9; then 130 g of mesoporous activated carbon (AC) and 0.1 g of sodium tetrafluoroborate as inducer were added, and the resulting mixture was transferred to the hydrothermal reactor after stirring at 40° C. for 20 min, and the resulting mixture was subjected to crystallization reaction at 140° C. for 80 min; the material was then slowly cooled to room temperature, filtered out and washed with anhydrous ethanol for 3 times, then the resulting material was dried in an oven at 120° C. for 10 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is lithium acetate.

The deep dehydration comprises: the metal fluoride-loaded activated carbon material AC/MFx·nH$_2$O was placed in a mixed gas flow of carbonyl fluoride and high-purity nitrogen and treated for 20 min. A volume ratio of carbonyl fluoride to high-purity nitrogen in the mixed gas flow was 0.1:1, and a gas flow rate of the mixed gas flow was 0.5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/Mx·nH$_2$O, so as to achieve the purpose of further removing moisture in HF.

The mesoporous activated carbon is mesoporous activated carbon with a high mesoporosity, and prepared as follows:

7 g of ammonium dihydrogen phosphate, 1 g of urea and 0.05 g of 1-butyl-3-methylimidazolium molybdotungstophosphate were added to 1000 g of water, stirred and mixed evenly, then 160 g of clean sawdust was soaked in the mixed solution at room temperature for 5 h, then heated to 40° C. and treated for 30 min, and then the sawdust was taken out, and dried in the oven at 200° C. for 30 min by blowing air; then it was pulverized, the pulverized material was sintered in a high-temperature furnace under inert atmosphere at 400° C. for 1 h, then the temperature was controlled at 300° C., activated gas was introduced and the material was treated for 20 min. The resulting material was purged using dry nitrogen for 5 min to obtain the mesoporous activated carbon with a high mesoporosity; the activated gas includes 10% of air, 5% of water vapor, and the balance of nitrogen.

The water content of the high-purity hydrogen fluoride prepared in this example is 44 ppb, and the total content of gas impurities is 108 ppb.

Comparative Example 3

The preparation method and use method of material for deep purification of HF electronic gas, the method for preparing the material has steps as follows:

15.2 g of acetate was dissolved in 2000 g of pure water and stirred for 10 min. After the solution was evenly dissolved, 126.4 g of disodium ethylenediaminetetraacetate was added thereto, stirred for 10 min to form a mixed solution, then 7.2 g of ammonium fluoride was added, and after the resulting mixture was evenly stirred, ammonia was added dropwise to adjust the pH value to 9; then 0.1 g of sodium tetrafluoroborate as inducer was added, and the resulting mixture was transferred to the hydrothermal reactor after stirring at 40° C. for 20 min, and the resulting mixture was subjected to crystallization reaction at 140° C. for 80 min; the material was then slowly cooled to room temperature, filtered out and washed with anhydrous ethanol, repeated washing with anhydrous ethanol for 3 times, then the resulting material was dried in an oven at 120° C. for 10 h to obtain the metal fluoride-loaded activated carbon material AC/MFx·nH$_2$O. After the resulting material was deeply dehydrated, the material for deep purification of HF electronic gas AC/MFx was obtained.

The hydrothermal reactor is a hydrothermal stainless steel reactor lined with polytetrafluoroethylene.

The acetate is lithium acetate.

The deep dehydration comprises: the metal fluoride-loaded activated carbon material AC/MFx·nH$_2$O was placed in a mixed gas flow of carbonyl fluoride and high-purity nitrogen and treated for 20 min. A volume ratio of carbonyl fluoride to high-purity nitrogen in the mixed gas flow was 0.1:1, and a gas flow rate of the mixed gas flow was 0.5 L/min per kilogram of the material.

The use method of the material for deep purification of HF electronic gas is as follows: the material for deep purification of HF electronic gas was loaded in a pressure-resistant stainless steel container to form an adsorption fixed bed, and then HF containing trace amount of water was passed through the fixed bed to make the composite material AC/MFx absorb trace amount of water in HF to form AC/MFx·nH$_2$O, so as to achieve the purpose of further removing moisture in HF.

The mesoporous activated carbon is mesoporous activated carbon with a high mesoporosity, and a process for preparing the mesoporous activated carbon with a high mesoporosity comprises:

16 g of dodecylurea, 1 g of urea and 0.05 g of 1-butyl-3-methylimidazolium molybdotungstophosphate were added to 1000 g of water, stirred and mixed evenly, then 160 g of clean sawdust was soaked in the mixed solution at room temperature for 5 h, then heated to 40° C. and treated for 30 min, and then the sawdust was taken out, and dried in the oven at 200° C. for 30 min by blowing air; then it was pulverized, the pulverized material was sintered in a high-temperature furnace under inert atmosphere at 400° C. for 1 h, then the temperature was controlled at 300° C., activated gas was introduced and the material was treated for 20 min. The resulting material was purged with dry nitrogen for 5 min to obtain the mesoporous activated carbon with a high mesoporosity; the activated gas includes 10% of air, 5% of water vapor, and the balance of nitrogen.

The water content of the high-purity hydrogen fluoride prepared in this example is 58 ppb, and the total content of gas impurities is 147 ppb.

The description of the above embodiments is only used to help understand the method and the core idea of the present disclosure. It should be pointed out that for those of ordinary skills in the art, without departing from the principle of the present disclosure, several improvements and modifications can be made to the present disclosure, and these improvements and modifications also fall within the protection scope of the claims of the present disclosure. Various modifications to these embodiments are obvious to those skilled in the art, and the general principles defined herein can be implemented in other embodiments without departing from the spirit or scope of the present disclosure. Therefore, the present disclosure will not be limited to the embodiments shown in this disclosure, but should be accorded the widest scope consistent with the principles and novel features disclosed herein.

What is claimed is:

1. A method for preparing a material for deep purification of HF electronic gas, comprising:

in parts by mass, dissolving 15.2-45.4 parts of acetate in 2000-4000 parts of pure water, and stirring for 10-30 min; after dissolving uniformly, adding 126.4-186.5 parts of disodium ethylenediaminetetraacetate, and stirring for 10-20 min to form a mixed solution; then adding 7.2-7.8 parts of ammonium fluoride and stirring; after mixing evenly, adding ammonia dropwise to adjust a pH value to 9-11; then adding 130-170 parts of mesoporous activated carbon and 0.1-0.5 parts of sodium tetrafluoroborate as an inducer, and stirring at 40-60° C. for 20-50 min; subsequently, transferring a resulting mixture to a hydrothermal reactor, and subjecting to a crystallization reaction at 140-180° C. for 80-120 min; thereafter, cooling slowly to room temperature, filtering to obtain a material, and washing with absolute ethanol; repeating washing with absolute ethanol for 3-5 times, and then drying a resulting material in an oven at 120-160° C. for 10-18 h to obtain a metal fluoride-loaded activated carbon material AC/MFx·nH$_2$O; subjecting the metal fluoride-loaded activated carbon material to a deep dehydration to obtain a material for deep purification of HF electronic gas AC/MFx;

wherein the mesoporous activated carbon is a mesoporous activated carbon with a high mesoporosity, and a process for preparing the mesoporous activated carbon with a high mesoporosity comprises:

in parts by mass, adding 7-34 parts of ammonium dihydrogen phosphate, 16-44 parts of dodecylurea, 1-8 parts of urea and 0.05-0.3 parts of 1-butyl-3-methylimidazolium molybdotungstophosphate into 1000-3000 parts of water and stirring; after mixing evenly, soaking 100-200 parts of a cleaned wood dust in a resulting mixed solution at room temperature for 5-10 h, and then heating to 40-80° C. and treating for 30-40 min; then taking out the wood dust, drying and then drying in an oven at 200-280° C. for 30-60 min by blowing air; subsequently, pulverizing and sintering the pulverized material in a high-temperature furnace under an inert atmosphere at a temperature of 400-800° C. for 1-6 h; then controlling a temperature at 300-400° C., introducing an activated gas, and treating for 20-40 min; thereafter, purging with dried nitrogen for 5-10 min to obtain the mesoporous activated carbon with a high mesoporosity, wherein the activated gas includes 10%-25% of air, 5%-20% of water vapor and the balance of nitrogen.

2. The method according to claim 1, wherein the hydrothermal reactor is a hydrothermal stainless steel reactor lined with polytetrafluoroethylene.

3. The method according to claim 1, wherein the acetate is alkali metal acetate, alkaline earth metal acetate, rare earth metal acetate or transition metal acetate.

4. The method according to claim 1, wherein the deep dehydration comprises: placing the metal fluoride-loaded activated carbon material AC/MFx·nH$_2$O in a mixed gas flow of carbonyl fluoride and high-purity nitrogen for 20-60 min, wherein a volume ratio of carbonyl fluoride to high-purity nitrogen in the mixed gas flow is (0.1-0.5):1, and a gas flow rate of the mixed gas flow is 0.5-5 L/min per kilogram of the material.

\* \* \* \* \*